United States Patent [19]
Zalite

[11] Patent Number: 5,246,061
[45] Date of Patent: Sep. 21, 1993

[54] THERMAL STORAGE BY HEAVY WATER PHASE CHANGE

[75] Inventor: Edgar P. Zalite, Bayville, N.Y.

[73] Assignee: Grumman Aerospace Corporation, Bethpage, N.Y.

[21] Appl. No.: 921,345

[22] Filed: Jul. 29, 1992

[51] Int. Cl.⁵ .............................................. F28D 20/00
[52] U.S. Cl. ...................................... 165/10; 165/41; 62/59; 62/259.3; 252/70
[58] Field of Search ................. 165/10, 104.11, 41, 165/902; 62/59, 259.3, 430, 434; 252/70

[56] References Cited

U.S. PATENT DOCUMENTS 3,935,063 1/1976 Duncbel ......................... 165/104.21
4,057,101 11/1977 Ruba et al. ......................... 165/902
5,115,859 5/1992 Roebelen, Jr. et al. ........... 62/259.3

*Primary Examiner*—Albert W. Davis, Jr.
*Attorney, Agent, or Firm*—Pollock, Vande Sande & Priddy

[57] ABSTRACT

Water coolant circulating in a closed loop may be cooled by passing it through a heat exchanger coil embedded within a block of heavy water ice. The ice will maintain the water, passing through the coil, at a temperature approximately 39° F. Maintenance of the working fluid at this temperature prevents it from freezing in coolant tubes. The system is particularly adapted for a liquid cooling space garment which must effectively conduct away heat from an astronaut's body when an astronaut exerts himself during physical activity.

6 Claims, 1 Drawing Sheet

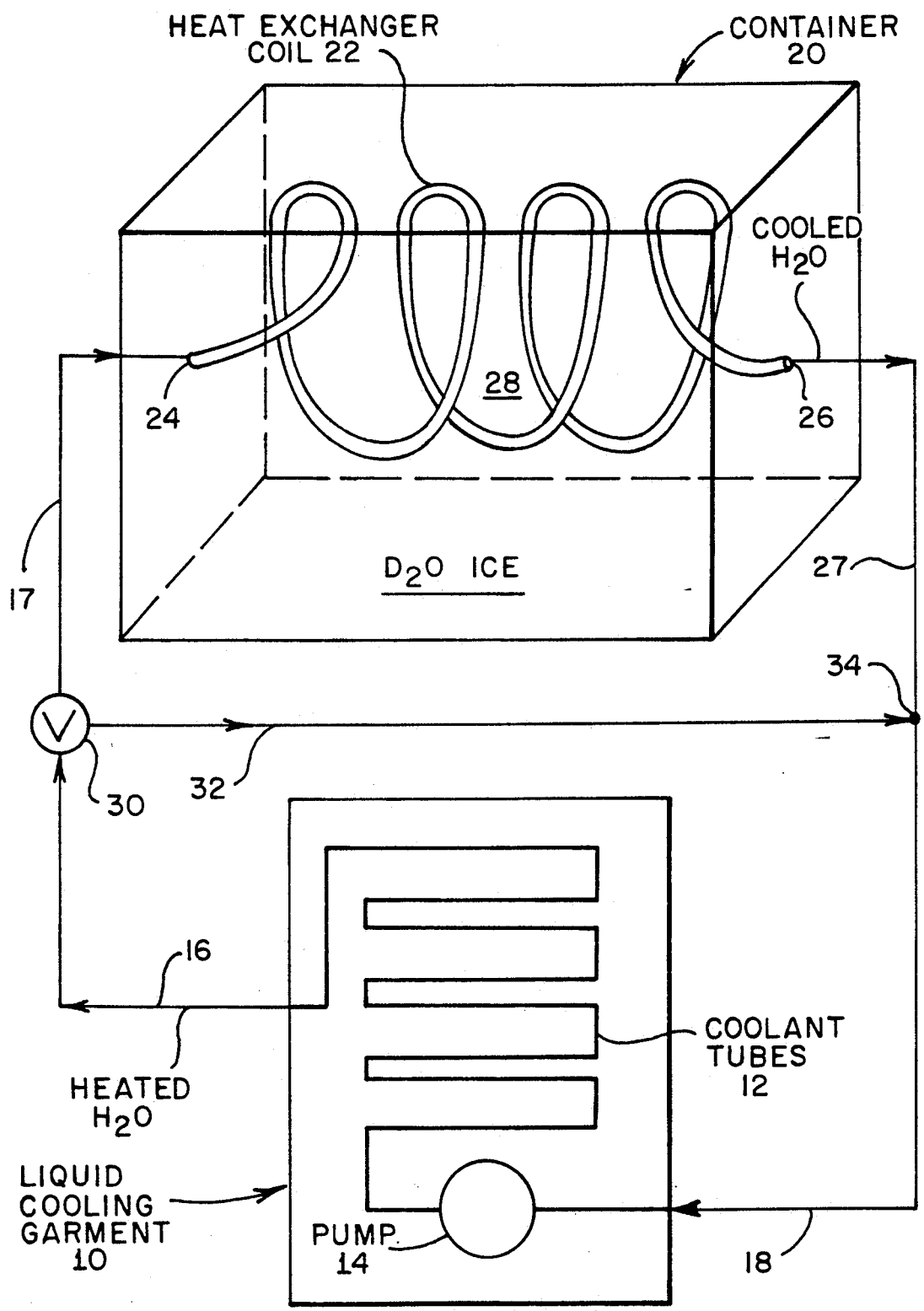

THERMAL STORAGE BY HEAVY WATER PHASE CHANGE

FIELD OF THE INVENTION

The present invention relates to heat exchangers, and more particularly to a heavy water thermal storage device for space suits.

BACKGROUND OF THE INVENTION

To work in the extremely cold temperatures of outer space, astronauts must wear protective space suits so that body heat may be maintained. However, liquid cooling of such garments is necessary in order to avoid heat build-up within the suit, which can cause discomfort or heat exhaustion, particularly during periods of physical activity.

The prior art has often used tubes within the garment to carry water which conducts excessive body heat away from the astronaut. A heat exchanger for the heated water often takes the form of a sublimator which forms specks of ice on the back of the garment. Heat transfer from the heated water of the space suit tubes causes the specks of ice to undergo a phase change —to vapor. The vaporization of the ice enables the body temperature of an astronaut within the suit to be comfortably regulated. However, a problem with the use of sublimators occurs when the evaporated ice becomes suspended in space as a vapor, due to the lack of gravity. Oftentimes, this vapor will become deposited on an astronaut's visor or optical equipment he carries, which is obviously disadvantageous.

In order to replace the sublimator design of the present invention, one might consider employing a heat storage system which avoids the emission of vapor in the immediate space of a working astronaut.

Heat can be stored effectively and efficiently in a constant temperature heat sink by pumping a working fluid through ice. As the ice melts it cools the working fluid and uses the heat to change from a solid to a liquid phase. If water were used as a working liquid and if an astronaut is relatively still and therefore not generating excess heat, there is a likelihood that water flowing through the space garment tubes will freeze at points, particularly near the ice. This would require the utilization of special heaters to ensure that the working fluid (water) does not freeze. The utilization of such heaters will then use up some of the ice storage capacity as well as adding extra complexity to the system.

A logical extension of this reasoning suggests the substitution of another liquid for water. Although certain liquids could function properly to achieve a liquid cooling effect of an astronaut's garment, such liquids, such as anti-freeze, are toxic when breathed in high concentrations for a prolonged period of time. Since such liquids would be circulating within a space suit, the chances of accidental leakage preclude their use.

BRIEF DESCRIPTION OF THE INVENTION

The present invention utilizes heavy water (deuterium oxide, $D_2O$) which is frozen and maintained in a storage container through which a space garment coolant passes to dump excess body heat and maintain a comfortable interior garment temperature for an astronaut. In a preferred embodiment of the present invention, the working fluid which flows through a closed loop is regular water. Part of the loop includes a heat exchanger coil which is embedded within a block of heavy water ice, instead of a block of regular water ice. A pump is integrated into the space garment so that the regular water flowing through the garment will be circulated through the heat exchanger coil embedded in the heavy water ice. The latter serves as a heat sink into which excess body heat may be dumped to maintain a suitable comfort range for an astronaut.

Deuterium oxide is simply water with an isotope of hydrogen instead of "normal" hydrogen. It has a melting point of 39° F., so that the "heavy ice"(frozen $D_2O$) cannot freeze the normal water working fluid circulating through the garment. This eliminates the need for special heating devices adjacent to the flow path of the working fluid. The end result is a saving of energy as well as a reduction in the amount of ice needed since the heat added by heating devices to maintain the working fluid in an unfrozen state has to be eventually absorbed by the ice. Heavy water is also completely non-toxic so that, if a working fluid leak occurs in the space garment, it will not be catastrophic. Finally, the heavy water does not add much weight to the system. Whereas the heat of fusion for normal water is 143 (BTU/Lb), for $D_2O$ it is 136. Other materials that freeze at appropriate temperatures (35°-40° F.) have much lower heats of fusion. These materials may include organic materials and certain exotic salts. These lower heats of fusion require 3-10 times the weight for the same amount of heat storage capability in melting ice. For the system of the present invention, the heavy water ice is initially maintained at a temperature ranging 32°-39° F. As the ice melts when subjected to heat exchange from the working fluid, the working fluid re-enters the garment tubing at a temperature close to 39° F, safely protected from freezing.

By securing a backpack-mounted container with frozen heavy water therein, it is possible to sustain the working fluid water within the garment at temperatures below 45° F. which will ensure a comfortable garment temperature for a working astronaut. For example, in a space garment one 8-hour EVA (extra-vehicular activity) produces about 12,000 BTUs. This requires about 88 pounds of heavy water ice for thermal storage. In a gravity-free environment, this is quite an acceptable load to be carried in a backpack.

As previously mentioned, the temperature of the working water fluid is lowered to about 39° F., which is cool enough to keep an astronaut comfortable even at the highest metabolic rates. For low metabolic periods, when warmer working water fluid is required, the cooled water can be mixed with uncooled water.

BRIEF DESCRIPTION OF THE FIGURE

The above-mentioned objects and advantages of the present invention will be more clearly understood when considered in conjunction with the accompanying drawing, in which:

the figure is a schematic representation of the present invention.

DETAILED DESCRIPTION OF THE INVENTION

The body portion of a space suit, also referred to as a liquid-cooling garment, is generally indicated by reference numeral 10. Coolant tubes 12 of conventional material and design are incorporated in the garment 10 and act as a radiator for picking up excessive body heat of an astronaut. A pump 14 is included in-line with the tubes 12 to pass normal water through the coolant tubes 12.

Excessive body heat raises the temperature of the working fluid (water) as it exits the garment along tube section 16. As will be explained shortly, the heated water becomes cooled by a heat exchanger existing within container 20. The result is the cooling of the working fluid as it exits container 20 at tube section 18 for recirculation through the coolant tubes 12. This forms a closed loop for recirculating working water fluid. In a preferred embodiment of the invention, container 20 may be carried in a backpack (not shown) which is worn by an astronaut. The interior of container 20 includes a heat exchanger coil 22 which has an inlet 24. This inlet has a coolant tube section 17 connected thereto which will allow heated normal water flowing through tube section 16 to undergo passage through heat exchanger coil 22 when an astronaut is exerting himself. The heat exchanger coil 22 is embedded within a heavy water ($D_2O$) block of ice 28. The outlet 26 of the heat exchanger coil 22 is connected with a coolant tube section 27 that directs the cooled working water liquid back into the garment 10 where it is circulated through coolant tubes 12 to maintain a comfortable garment temperature for an astronaut.

The heavy water ice 28 is initially at a temperature between 32°-39° F. As time goes on the heavy water ice heats up and melts as heat from the circulating water is removed. The water exiting outlet 26 will be at a temperature close to 39° F., safely protecting the coolant tubes 12 and tube sections 16, 17, 18, and 27 from freezing.

It is anticipated that in a space garment 10 one 8-hour EVA (extra-vehicular activity) will produce about 12,000 BTUs. This will require about 88 pounds of heavy water ice for thermal storage. The exit temperature at output 26 is approximately 39° F. which is cool enough to keep an astronaut comfortable even at the highest metabolic rates. For lower metabolic periods when warmer working water liquid is required, a valve 30 may be turned so that a portion of the heated water in tube section 16 can bypass the heat exchanger coil 22 and instead flow through bypass tube section 32. The latter tube section terminates in a T connector 34 which directs the bypassed uncooled working fluid back into the garment 10. By adjusting valve 30 a mixture of cooled and uncooled working fluid can be mixed for entry into garment 10. The valve 30 may be a simple hand-actuated valve of conventional design or a conventional thermostatically controlled valve which automatically adjusts the working fluid temperature in response to changes in metabolic rates of an astronaut.

Although the present system has been explained in connection with a liquid cooling garment for space use, it can be used for any fusible heat sink application where water is the working fluid which must be cooled to near freezing yet still protected against freezing.

It should be understood that the invention is not limited to the exact details of construction shown and described herein for obvious modifications will occur to persons skilled in the art.

I claim:

1. A fusible heat sink comprising:
   a container;
   a mass of heavy water ice ($D_2O$) located in the container;
   a heat exchanger coil located in the container and embedded within the ice;
   a heat exchanger coil inlet introducing heated normal water ($H_2O$) into the coil for non-contacting circulation through the heavy water ice; and
   a heat exchanger coil outlet for making available cooled normal water at a temperature above its freezing point.

2. The structure set forth in claim 1 together with coolant tubes connected between the inlet and outlet in a closed loop for carrying circulating normal water from a heated space to the heat exchanger coil.

3. The structure set forth in claim 2 together with a pump for forcing water circulation through the loop.

4. A space suit cooling system comprising:
   a container borne by a wearer;
   a mass of heavy water ice ($D_2O$) located in the container;
   a heat exchanger coil located in the container and embedded within the ice;
   a heat exchanger coil inlet for introducing heated normal water ($H_2O$) into the coil for non-contacting circulation through the heavy water ice;
   a heat exchanger coil outlet for making available cooled normal water at a temperature above its freezing point;
   a plurality of coolant tubes distributed in the suit and circulating normal water for absorbing excess wearer body heat, the tubes connected in a closed loop between the inlet and outlet; and
   a pump for circulating the normal water through the closed loop.

5. The structure set forth in claim 4 together with valve means connected in line with the inlet and outlet for selectively mixing cooled and uncooled normal water thereby allowing regulation of heat absorption.

6. A method for cooling the interior of a space suit comprising the steps:
   containing a mass of heavy water ice ($D_2O$);
   exchanging heat between normal heated water circulating in a closed loop through the ice, thereby cooling the normal water; and
   circulating the cooled water through the interior of a space suit thus conducting away excess heat from the interior of the suit and maintaining a comfortable suit temperature for the wearer.

* * * * *